United States Patent [19]

Adamson

[11] 4,051,289
[45] Sept. 27, 1977

[54] COMPOSITE AIRFOIL CONSTRUCTION

[75] Inventor: Arthur P. Adamson, Cincinnati, Ohio

[73] Assignee: General Electric Company, Cincinnati, Ohio

[21] Appl. No.: 675,902

[22] Filed: Apr. 12, 1976

[51] Int. Cl.² .................................................. B32B 5/12
[52] U.S. Cl. .................................. 428/113; 244/123;
416/224; 416/230; 416/241 A; 428/174;
428/181; 428/367; 428/378; 428/902; 428/116;
156/227
[58] Field of Search ............... 428/113, 174, 181, 378,
428/408, 902, 367, 265, 72, 116; 416/224, 226,
230, 229 R, 223 R, 241 A; 244/123-124, DIG. 1

[56] References Cited

U.S. PATENT DOCUMENTS

| | | | |
|---|---|---|---|
| 3,321,019 | 5/1967 | Dmitroff et al. | 416/230 |
| 3,528,875 | 9/1970 | MacDonald et al. | 428/181 |
| 3,602,608 | 8/1971 | Morley | 416/224 |
| 3,637,325 | 1/1972 | Morley | 416/224 |
| 3,762,835 | 10/1973 | Carlson et al. | 416/224 |
| 3,883,267 | 5/1975 | Baudier et al. | 416/241 A |

FOREIGN PATENT DOCUMENTS 2,062,053    1970    Germany

*Primary Examiner*—George F. Lesmes
*Assistant Examiner*—P. J. Thibodeau
*Attorney, Agent, or Firm*—Robert C. Lampe, Jr.; Derek P. Lawrence

[57] ABSTRACT

An article such as a blade fabricated from a plurality of high-strength, reinforcing filaments embedded in a matrix material and characterized by a portion of the filaments oriented transverse to the blade longitudinal axis in a direction through the blade to enhance transverse shear strength. In one embodiment, a plurality of columnar filament cores are each wrapped with a filament sheet and bonded together laterally to form the blade primary structure. The orientation of the filaments within the sheet forms an angle with the core longitudinal axes such that at least a portion of the sheet filaments runs transverse to the blade from one aerodynamic surface to the other. In an alternative embodiment, a blade is formed of a plurality of bonded filament laminates accordian folded with the fold lines angled with respect to the longitudinal axes of the filaments, the distance between fold lines being equal to or greater than the blade thickness.

22 Claims, 15 Drawing Figures

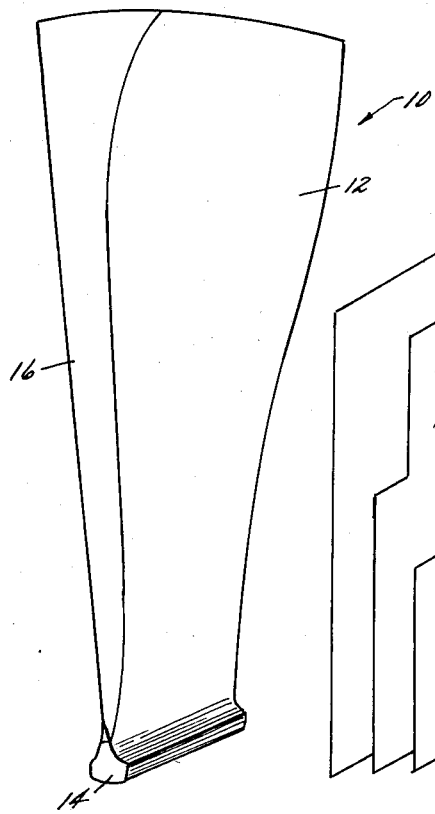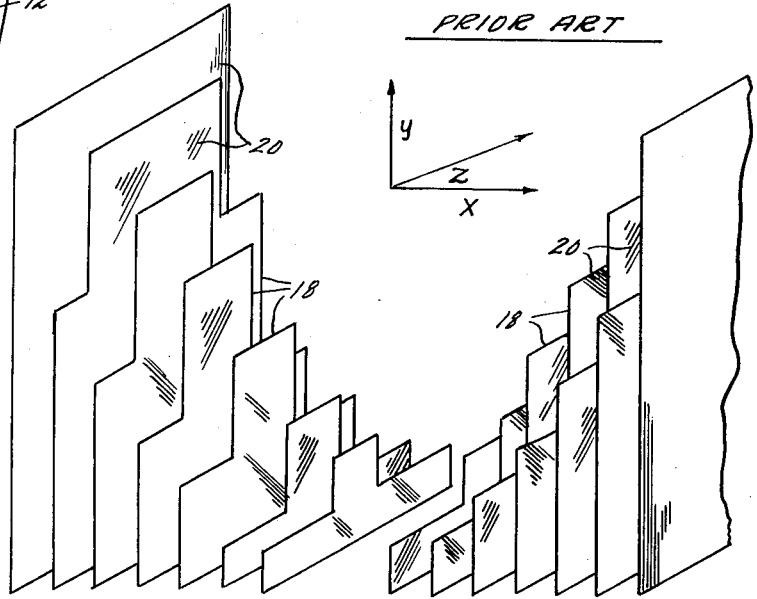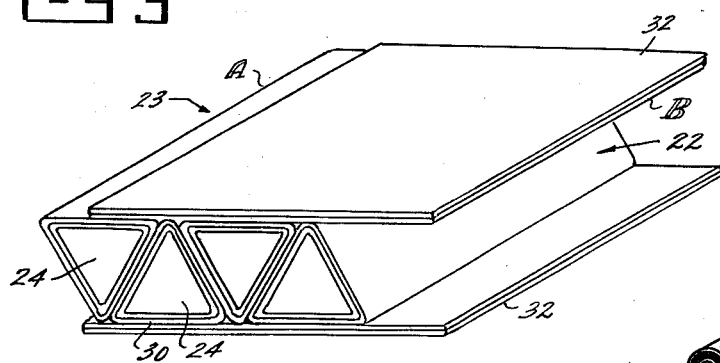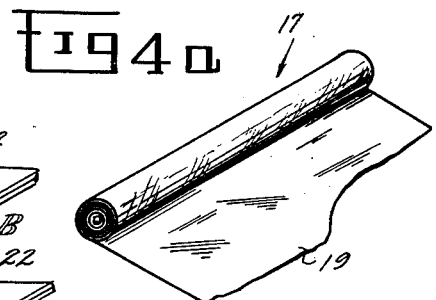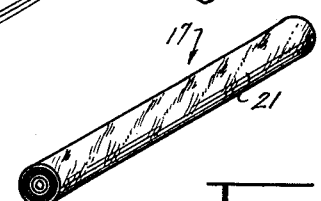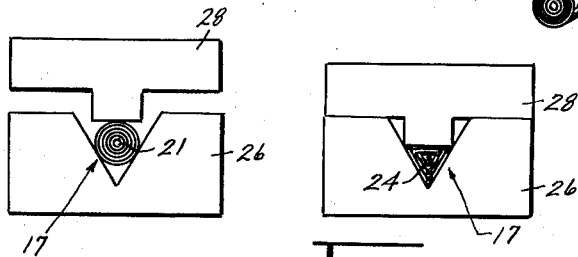

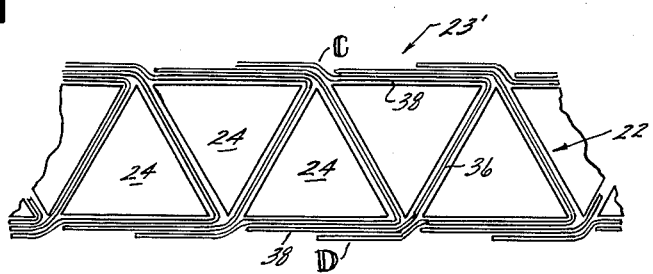
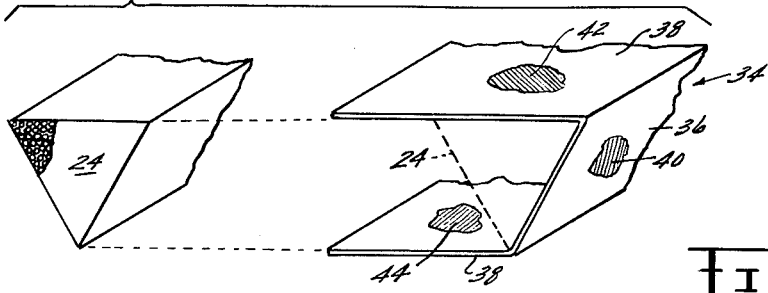
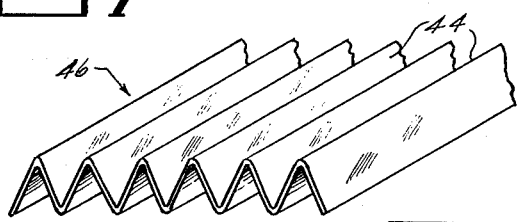
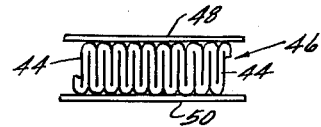
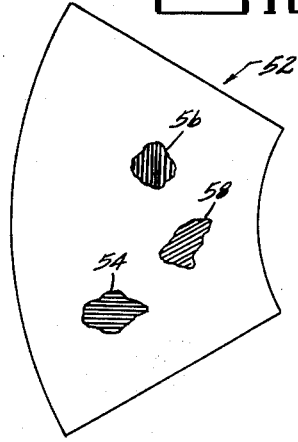
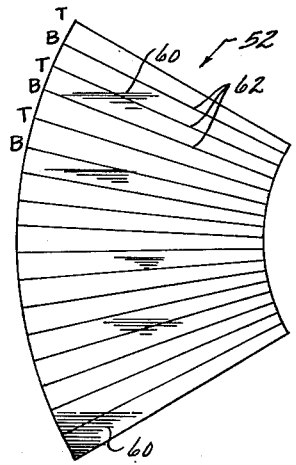
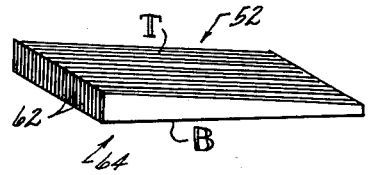
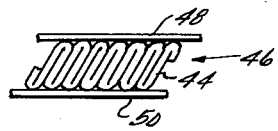

COMPOSITE AIRFOIL CONSTRUCTION

BACKGROUND OF THE INVENTION

This invention relates to composite blades for use in fluid flow machines and, more particularly, to improving the shear strength characteristics thereof.

In recent years, significant advances have been made in developing composite blades for fluid flow machines, such as gas turbine compressors and fans, by making use of structural composite reinforcements having high strength characteristics. Generally, the major portion, or primary structure, of the blade comprises substantially parallel laminates of small diameter reinforcing filaments, having high strength and high modulus of elasticity, embedded in a lightweight matrix which is generally extremely weak compared to the longitudinal strength of the filaments (typically only one to five percent as strong). These laminates, possessing essentially unidirectional strength characteristics, are laid up at specified predetermined angles to each other, and to the blade longitudinal axis, and the matrix cured to create a rigid structure. For example, the blade can be made strong in tension longitudinally and chord-wise by suitably orienting the fibers in each laminate. In embodiments involving predominantly nonmetallic materials, the blades comprise graphite filament laminates in an epoxy resin, though any fiber embedded in any binder, such as an organic resin, may be employed. Further, the structures may also comprise any metallic system including boron filaments in an aluminum matrix.

One factor which has discouraged the introduction of composite blades into operational service in aircraft gas turbine engines is their vulnerability to what is commonly referred to as foreign object damage. Many types of foreign objects may be entrained in the inlet of a gas turbine engine, ranging from large birds such as eagles, to hailstones, sand and rain. While the smaller objects can erode the blade materials and degrade the performance of the fan or compressor, impact by the larger objects may cause more severe damage. Under large impact loads, composite blades severely distort, twist and bend developing high localized multidirectional stresses. These may result in portions of the blade being torn loose or in extensive delamination of the filament laminates. A contributing factor is that the laminated composite blade is very weak in tension perpendicular to the plane of the blade (i.e., across the airfoil portion from pressure to suction surface), and weak in resisting shear loads between the laminates. In these types of loadings, the loads are carried entirely by the matrix which, as noted above, is extremely weak compared to the filaments.

Several approaches have been considered in an effort to improve the transverse and interlaminar shear strength of composite blade airfoils and, thus, improve their impact tolerance. These approaches have primarily involved selecting the proper filament/matrix system and processing the material in a manner so as to optimize their load-carrying potential. While moderate progress has been made, it is apparent that the foreseeable structural materials may not afford adequate transverse shear capability without a change in the structural configuration. Thus, it becomes desirable to develop a composite blade for turbomachinery application which does not rely entirely on the matrix properties for resisting transverse shear loads.

SUMMARY OF THE INVENTION

Accordingly, it is the primary object of the present invention to provide an arrangement of the filaments whereby tensile loading perpendicular to the blade surface and shear loading (which tends to move the blade pressure surface longitudinally or chord-wise relative to the suction surface) are carried by the filaments.

It is another object of the present invention to provide shear webs within the composite blade to permit the blade to carry blending loads, as in a beam.

It is yet another object of the present invention to provide an improved method of fabricating a filament composite blade which will increase its transverse shear strength and improve its impact load tolerance.

These and other objects and advantages will be more clearly understood from the following detailed description, the drawings and specific examples, all of which are intended to be typical of rather than in any way limiting to the scope of the present invention.

Briefly stated, the above objects are accomplished in a turbomachinery blade by a unique choice of filament layup patterns wherein high strength reinforcing filaments pass through the blade from one aerodynamic surface to the other to carry the transverse (across the chord) shear and tension loads. In one embodiment, bundles of longitudinal filaments are formed, each having a rectangular or triangular cross section, and which may be laid up adjacent to each other (chord-wise) essentially parallel to the blade longitudinal axis to form the blade contour and to carry the majority of the blade longitudinal loading. Around one or more of these filaments bundles are wound sheets or plies of other reinforcing filaments embedded in a matrix, the filaments in the sheets forming a predetermined angle with respect to the filaments in the bundles, typically ± 45°. In this manner, the sheet filaments run through the blade from one aerodynamic surface to the other to structurally tie the blade together in the transverse direction. Preferably, each filament bundle is tied to the adjacent bundle by means of the filament sheet so as to increase the transverse shearing strength between adjacent bundles.

In another embodiment, the inherent weakness is overcome primarily by binding the filaments in a thin layer held together by an uncured binder or matrix. These layers are then laminated to form a sheet, but with the filaments of each layer in a predetermined orientation with respect to the other layers, all layers being more or less parallel to each other. Thereafter, the sheet is repeatedly folded in accordian-like fashion so that at least some of the filaments are disposed in planes essentially perpendicular to the original planar surface of the sheet. This provides a thicker sheet having some generally longitudinal filaments but also having filaments which criss-cross transversely from the top surface to the bottom surface of the thicker sheet to hold the layers together, prevent delamination and to carry shear loads across the thickness of the sheet. Facing sheets are provided on the top and bottom surfaces of the thicker sheets and having reinforcing filaments suitably oriented to provide reinforcement against the forces tending to unfold the folded filament sheets. The final configuration is then cured or bonded to rigidize the structure.

In yet a further extension of the present invention, the filament orientation may be chosen as to prevent or minimize blade untwist under centrifugal loading, and to put the resulting stresses in a desirable portion of the blade from a strength standpoint, such as at the thicker sections.

Consistent with the above structural improvements, a method is provided for fabricating a blade to improve its transverse shear characteristics.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which is given by way of example with the accompanying drawings in which:

FIG. 1 is a perspective view of a gas turbine engine composite fan blade which may be constructed in accordance with the present invention;

FIG. 2 illustrates, in perspective, the manner of assembling composite filament laminates in the manufacture of prior art rotor blades;

FIG. 3 is a simplified schematic showing the general arrangement of one embodiment of the present invention;

FIG. 4 depicts the forming process for a composite filament core element for use with the subject invention;

FIG. 5 illustrates schematically an alternative embodiment similar to FIG. 3, of a composite article fabricated in accordance with the present invention;

FIG. 6 illustrates in an exploded view the constituent parts of the article of FIG. 5;

FIG. 7 illustrates an alternative embodiment of the invention of FIG. 3 wherein filament laminate sheets are folded to enhance transverse shear characteristics;

FIG. 8 depicts a partial blade section formed in accordance with the embodiment of FIG. 7;

FIG. 9 illustrates a method of forming a tapered blade section utilizing the teachings of FIGS. 7 and 8;

FIG. 10 schematically depicts the filament orientation of the embodiment of FIG. 9;

FIG. 11 schematically depicts a tapered blade section formed in accordance with the present invention; and FIG. 12 schematically depicts an alternative filament orientation of the embodiment of FIG. 7.

DESCRIPTION OF THE PREFERRED EMBODIMENT

Referring to the drawings wherein like numerals correspond to like elements throughout, attention is first directed to FIG. 1 wherein a composite blade 10 for use in a fluid flow machine and which may be constructed in accordance with the present invention is illustrated. While not so limiting, the blade 10 is adapted for use in axial flow gas turbine engine fans. It will become apparent to those skilled in the art that the present invention offers an improvement for many load-bearing composite articles and that fan blade 10 is merely meant to be illustrative of one such application. Accordingly, fan blade 10 is shown to comprise an airfoil portion 12, generally of radially variant camber and stagger, and a root portion 14 which enables the blade to be mounted on and retained by a rotatable disc or hub in a conventional manner. A leading edge protective device 16 provides a protective sheath bonded to the leading edge of the blade to increase its tolerance to foreign object impact. Additionally, a typical flow path defining platform, not shown, could be mounted between the airfoil and root portions of the blade.

Heretofore, composite blades (or at least the major portion thereof) have comprised laminates of small diameter reinforcing filaments having high strength and high modulus of elasticity embedded in a lightweight matrix. As best depicted in FIG. 2, an individual blade is formed from a plurality of laminates 18 cut from larger sheets, and of varying contour to provide the tapering blade cross section typical of fan blades. The assembly of laminates 18 is placed in a mold and, with the application of heat and pressure, is bonded to form a composite blade having a profile as in FIG. 1. In a nonmetallic composite blade, the airfoil portion 12 would typically comprise laminates of graphite filaments in an epoxy resin, though the present invention anticipates the use of any fiber embedded in any binder, such as an organic resin, for its structure. Further, it is well known that laminate 18 could comprise any metallic system, such as boron filaments in an aluminum matrix. It is recognized that the present invention soon to be described is adapted to take advantage of all known or anticipated materials, but which utilizes them in a unique structural relationship distinct from that of FIG. 2.

Continuing with FIG. 2, it may be recognized that the blade may be made strong in tension longitudinally (along the Y axis direction) and axially (along the Z axis direction) by suitably orienting the filaments 20 in each laminate sheet 18 (typically ± 45° to the Y axis, wherein Y is generally the radial direction of an assembled bladed rotor). In general, the matrix material is extremely weak compared to the filaments 20, typically only 1 to 5 percent as strong. Hence, the laminated blade possesses an inherent weakness in tension in the X direction (the substantially circumferential direction of an assembled rotor), and in the direction generally perpendicular to the surfaces of airfoil portion 12. In other words, the blade is entirely dependent upon the matrix strength and intermatrix bonding to prevent relative separation of the laminates 18. Additionally, there is a similar weakness in resisting shearing loads which tend to move adjacent laminates longitudinally or axially with respect to each other, since these loads are also resisted entirely by the matrix material. All of the foregoing tend to occur when an assembled blade is impacted upon one side by a foreign object which causes the blade to bend and/or twist, and delamination is prevented only if the strength of the matrix material is not exceeded.

In accordance with one of the objects of the present invention, a filament orientation is provided which permits the foregoing three types of loading to be carried directly by the filaments, thereby substantially freeing the blade strength in these three directions from its other dependence upon matrix strength. Accordingly, FIG. 3 depicts in schematic form a simplified embodiment of the subject matter of the present invention. Therein, a plurality of elements 22 of generally triangular cross section are laid up in alternating inverted relationship to form the primary structure of an airfoil, herein depicted as a plate 23 for simplicity. Each element comprises a central core 24, also of generally triangular cross section, and a plurality of substantially parallel, high strength, reinforcing filaments. Referring briefly to FIGS. 4a through 4d for a preferred method of forming core 24, a plurality of such unidirectional, small-diameter filaments embedded in a partially cured polymeric resin, for example, and generally designated 17 is initially formed in a sheet 19 which is subsequently tightly rolled into a cylindrical shape 21 (FIGS. 4a and 4b). While not necessary to the practice of the present invention, the resulting cylinder can be twisted for reasons to be discussed hereinafter. The cylinder is placed between representative cooperating dies 26, 28 (FIG. 4c) and, with the addition of sufficient heat and pressure, is formed and cured into triangular core 24 (FIG. 4d).

Continuing with the embodiment of FIG. 3, each such core 24 is wrapped with a similar filament/matrix sheet 30 wherein the filaments of the wrapping are disposed at a predetermined angle with respect to the longitudinal axis of the core 24, typically 45°. In some applications, two wrapping sheets may be wound successively or simultaneously around the core so as to provide ± 45° fiber orientation in each element, and it is recognized that other fiber orientations may be chosen to solve unique structural problems. Clearly, the filaments within the wrapping sheet 30 between adjacent cores run across the plate (up and down in FIG. 3) to structurally tie the blade together in the transverse direction without reliance on weak matrix materials to carry shear loads. Elements 22 are then laid side by side and sandwiched between thin facing sheets 32 of filament/matrix material, the filaments of which are also deposited at an angle with respect to the core longitudinal direction to aid in tieing the elements together. The entire structure is then subjected to heat and pressure to cure or polymerize the matrix material and to form a rigid, unitized blade. Of course, the cores 24 may be tapered as required by the structure and may be square, rectangular, hexogonal, circular or otherwise in cross section, as well as triangular. However, the structure of FIG. 3 is particularly well adapted for carrying loads in the chordwise direction (A to B) because of the truss-like configuration, the wrapping sheets 30 forming shear webs to permit the blade to carry bending loads, as in a beam.

FIGS. 5 and 6 depict a modification of the embodiment of FIG. 3 to further strengthen the cleavage planes between adjacent triangular elements 22. Therein, a slightly modified plate 23' (also representative of a blade portion, for example) is shown to comprise a repeating plurality of two basic elements: core 24 as defined with respect to FIG. 3 and three-sided channel 34, the base 36 of which forms an acute angle with respect to one side 38 and an obtuse angle with respect to the other side 40 to thereby conform to the cross-sectional profile of core 24. Preferably, channel 34 comprises a sheet (or laminate of several sheets) of unidirectional, small diameter, high strength, reinforcing filaments composited in a matrix in a manner now well understood. Plate 23' is formed by nesting together elements 24 and 34 in alternating, inverted relationship as depicted in FIG. 5. It becomes readily apparent that each channel 34 receives at least one core 24 within its closed end and at least partially overlaps the next core to the left thereof in FIG. 5. In fact, in FIG. 5, each channel receives portions of at least three adjacent cores.

The filament orientation within channel 34, with respect to the longitudinal direction of core 24, may be chosen in the direction of overlap as at 40 so as to resist across-the-chord loads across the plate (from D to C) and to prevent lateral separation of adjacent cores when the plate is bonded into a rigid article. Alternatively, the filament orientation could be as represented at 42 or 44 to assist in carrying some of the longitudinal tension loads in cooperation with cores 24. Often, both filament orientations will be selected for use in the same plate, the channel comprising a laminate of two or more sheets with the angle of the constituent filaments chosen consistent with anticipated shear loads. The configuration of FIGS. 5 and 6 is particularly well adapted to mass manufacturing processes since it comprises only two separate element types which, when properly nested, form a plate structure.

FIGS. 7 and 8 illustrate an alternative embodiment wherein inherent weaknesses in the blade nonlongitudinal direction have been overcome. In this embodiment, the weaknesses are overcome by arranging the filaments in sheets of partially cured polymeric resin, for example, and laminating the sheets such that the filament longitudinal axes are oriented in predetermined directions. Preferably, the first sheet would be oriented essentially parallel to the blade longitudinal axis while other sheets would be oriented ± 45' to the first sheet. This technique yields a lamination having strength in two or more directions, all more or less in a plane or continuous curved surface and is, so far, completely conventional and representative of common practice. In the present invention, however, such a laminated sheet (or even a single sheet layer) is repeatedly folded in accordian-like fashion as in FIG. 7 with the fold lines 44 running in the substantially longitudinal direction so that some of the filaments are in surfaces disposed at an angle to the original surface plane. Thus, the resulting plate 46 is considerably thicker than the orignal lamination and possesses filaments which criss-cross from the top surface to the bottom surface of the thicker sheet. These criss-cross filaments provide fibrous strength to hold the filament sheet together and prevent delamination. The entire structure, with top and bottom facing sheets 48 and 50, respectively (FIG. 8), added and having filament orientation such as to prevent unfolding, is then subjected to heat and pressure sufficient to cure or polymerize the matrix material and form the unitized, rigid plate 46. Alternatively, the folded sheet may be skewed as in FIG. 12 such that the filaments are in surfaces forming acute angles to the chordwise direction to increase chordwise shearing strength.

FIGS. 9 through 11 teach a method of forming a tapered composite blade utilizing the concept of FIGS. 7 and 8. As previously discussed, a lamination of several filament sheets may be formed, the resulting lamination 52 being generally planar. Depending on the width and taper desired in the resulting plate, and the required strength, the lamination 52 may contain several changes of filament sheet orientations. For example, in FIG. 10 the filament orientation of layer 54 is substantially longitudinal whereas the filaments of layers 56 and 58 are disposed at predetermined angles to the longitudinal direction.

In FIG. 9, lines 60 represent the longitudinal filament direction of layer 54. Fold lines 62 are labeled T and B in an alternating relationship depending upon final location of each fold line in the finished tapered plate 64 of FIG. 11. The surfaces between the fold lines represent the final vertical sections through the completed plate 64. By comparison of the filament direction with the fold lines in FIG. 9, it will be apparent that the final plate contains filaments running not only longitudinally, but also generally from top to bottom. Though a plate tapered in one direction only is shown, a plate having transverse taper or varying thickness for an airfoil contour can readily be formed by varying the folding pattern. As with the plate of FIGS. 8 and 12, it may be desirable to bond surface layers of filaments to the plate with the filament orientation such as to prevent unfolding or to provide torsional rigidity. It will also be desirable at times to bond one tapered plate to another to form nonlinear tapers as, for instance, a dovetail on an airfoil. Additionally, it may also be desirable to insert slivers of metallic material between the folds to further optimize the material's properties and enhance their load-carrying capability.

The teachings of the present invention may be utilized to overcome yet another problem inherent in rotating turbomachinery. In particular, fan blades as shown in FIG. 1 can be considered to be twisted. tapered, bent plates. Due to the twist of the blades, required for aerodynamic reasons, the blade tends to untwist due to loads produced by the centrifugal force field caused by blade rotation. This untwist has two adverse consequences: first, it tends to modify the shape of the blade so that it is no longer aerodynamically correct, and, secondly, it causes high stresses in the leading and trailing edges of the blade. These are the regions where the blades are thinnest and, hence, unable to strongly resist these stresses. The present invention provides a means to minimize the untwist and for shifting the resulting stresses to a desirable portion of the blade, such as to the thicker sections.

Referring again to FIG. 4b, it was earlier mentioned that the roll or cylinder 21 of elongated filaments could be twisted prior to forming it into triangular core member 24. If twisted into a generally spiral configuration, and ultimately fabricated into a plate (or blade) as taught in FIGS. 3 or 5, the spiraled filaments will tend to cause the triangular core section to untwist under the influence of centrifugal loads. By the proper selection of spiral angles and filament orientation within the core, the torque generated by the core untwist can completely (or partially) balance the torque generated by the untwist tendency of the overall blade geometry. Thus, blade distortion and edge stresses will be minimized. On the other hand, it may be desirable in some cases to spiral the fibers in the opposite direction so as to provide for increased blade twist. This will, in some cases, be useful to modify the aerodynamic configuration as a function of rotational speed.

It will be obvious to one skilled in the art that certain changes can be made to the above-described invention without departing from the broad inventive concepts thereof. For example, while the present discussion has been directed primarily to a single type of high strength, reinforcing filament bonded in a single type of matrix material, it is clear that different materials may be used for the various layers and binders to further match the material's properties to the requirements. And, while a rotating blade structure has been emphasized herein, it is obvious that the teachings of the present invention are equally applicable to stationary composite articles. It is intended that the appended claims cover these and all other variations in the present invention's broader inventive concepts.

Having thus described the invention, what is claimed as novel and desired to be secured by Letters Patent of the United States is:

1. A composite article having an upper surface and a lower surface and comprising a plurality of columnar elements bonded together along adjacent complementary interfaces, each of said element characterized by:

a bundled core of high modulus, substantially parallel core filaments embedded in a core matrix; and a sheet of high modulus, substantially parallel sheet filaments embedded in a sheet matrix, wherein the longitudinal axes of the sheet filaments are oriented at an angle to the core filaments and said sheet is wrapped and bonded about said core such that at least a portion of the sheet filaments run transverse to the core filaments through the article in a direction from the upper surface to the lower surface, at the interface.

2. The composite article as recited in claim 1 wherein said sheet comprises a lamination of several layers of substantially parallel sheet filaments embedded in a sheet matrix and wherein at least one layer is characterized by the filaments thereof being oriented at an angle to the core filaments.

3. The composite article as recited in claim 1 wherein two adjacent cores and elements are substantially triangular in cross section, the adjacent elements being bonded in alternating inverted relationship to each other with the triangle bases generally parallel to the upper and lower surfaces.

4. The composite article as recited in claim 1 further comprising two filament composite facing sheets bonded to said elements and sandwiching said elements therebetween.

5. The composite article as recited in claim 4 wherein the filaments within the facing sheets are oriented at an angle to the core filament longitudinal axes.

6. The composite article as recited in claim 1 further characterized by a sheet formed into a substantially U-shaped channel having a base and two sides, the channel receiving a core which is bonded within the closed end thereof, filaments within the base of the channel running transverse to the core filaments in a direction from the upper surface to the lower surface.

7. The composite article as recited in claim 6 wherein each core is substantially triangular in cross section and each U-shaped channel is contoured such that one side forms an acute angle with the base and the other side forms an obtuse angle with the base.

8. The composite article as recited in claim 1 further characterized by a plurality of said sheets formed into substantially U-shaped channels, each having a base and two sides and each channel receiving a core bonded within the closed end thereof, and wherein laterally adjacent pairs of cores and channels are bonded together with the sides of at least one channel receiving therebetween the next laterally adjacent core and channel.

9. The composite article as recited in claim 8 wherein said cores are substantially triangular in cross section, each core being bonded within its associated channel in alternating inverted relationship to each other.

10. The composite article recited in claim 8 further characterized by the upper and lower surfaces being contoured to a blade aerodynamic profile.

11. The composite article as recited in claim 1 wherein the core filaments and the sheet filaments are comprised of a first material, and the core matrix and the sheet matrix are comprised of a second material.

12. The composite article as recited in claim 1 further characterized by the upper and lower surfaces being contoured to a blade aerodynamic profile.

13. A composite article comprising a sheet of high modulus collimated filaments embedded in a matrix material wherein the sheet is accordian folded with the fold lines angled with respect to the longitudinal axes of the filaments, the distance between fold lines being substantially equal to the thickness of the article, and wherein at least a portion of the filaments are oriented through the thickness of the article.

14. The composite article as recited in claim 13 contoured to a blade aerodynamic profile.

15. The composite article are recited in claim 13 wherein the sheet comprises a lamination of several layers of high modulus, collimated filaments embedded in a matrix and wherein at least one layer is characterized by the filaments thereof being oriented at an angle to the fold lines.

16. The composite article as recited in claim 13 further comprising two filament composite facing sheets bonded to and sandwiching the folded sheet therebetween.

17. The composite article as recited in claim 16 wherein the filaments within the facing sheets are oriented at an angle to the fold lines.

18. The composite article as recited in claim 13 wherein the fold line locations of the sheet, prior to folding, fan out to provide taper to the folded article.

19. A composite blade having an upper surface and a lower surface and comprising a plurality of columnar elements bonded together along adjacent complementary interfaces, each of said elements characterized by:
   a bundled core of high modulus, substantially parallel, core filaments embedded in a core matrix; and
   a sheet of high modulus, substantially parallel, sheet filaments embedded in a sheet matrix; and wherein the longitudinal axes of the sheet filaments are oriented at an angle to the core filaments; and
   said sheet is wrapped and bonded about said core such that at least a portion of the sheet filaments runs transverse to the core filaments through the blade in a direction from the upper surface to the lower surface, at the interfaces.

20. The composite blade as recited in claim 19 wherein the bundled core of filaments is twisted along its longitudinal axis.

21. The composite blade as recited in claim 20 wherein the direction of twist is such as to counter the inherent blade untwist under centrifugal loads.

22. In a method of manufacturing a composite article, the step of accordian folding a sheet of high modulus collimated filaments embedded in a matrix, with the fold lines angled with respect to the longitudinal axes of the filaments and the distance between fold lines substantially equal to the thickness of the article.

* * * * *